(12) United States Patent
Han et al.

(10) Patent No.: US 8,491,954 B2
(45) Date of Patent: Jul. 23, 2013

(54) METHOD OF PRODUCING NOT-HARDENED RICE CAKE AND RICE CAKE PRODUCED BY USING THE SAME

(75) Inventors: Gwi Jung Han, Ansan-si (KR); Hye Young Park, Seoul (KR); Dong Sun Shin, Hwaseong-si (KR); Sung Mi Cha, Seongnam-si (KR); Min Sook Kang, Suwon-si (KR); Hye Sun Choi, Hwaseong-si (KR); Seong Yeol Baek, Suwon-si (KR); Young Hwang, Yongin-si (KR)

(73) Assignee: Republic of Korea (Management: Rural Development Administration), Gyeonggi-do (KR)

( * ) Notice: Subject to any disclaimer, the term of this patent is extended or adjusted under 35 U.S.C. 154(b) by 0 days.

(21) Appl. No.: 13/394,792

(22) PCT Filed: Dec. 22, 2010

(86) PCT No.: PCT/KR2010/009194
§ 371 (c)(1),
(2), (4) Date: Mar. 8, 2012

(87) PCT Pub. No.: WO2011/096644
PCT Pub. Date: Aug. 11, 2011

(65) Prior Publication Data
US 2012/0164305 A1 Jun. 28, 2012

(30) Foreign Application Priority Data

Feb. 5, 2010 (KR) .................. 10-2010-0010672
Dec. 7, 2010 (KR) .................. 10-2010-0123901

(51) Int. Cl.
*A23L 1/00* (2006.01)
(52) U.S. Cl.
USPC .................. 426/618; 426/658; 426/103

(58) Field of Classification Search
USPC ............................................. 426/618
See application file for complete search history.

(56) References Cited

U.S. PATENT DOCUMENTS 2,498,573 A * 2/1950 Ozai-Durrani ............... 426/461
4,963,370 A * 10/1990 Uchida et al. ................ 426/7

FOREIGN PATENT DOCUMENTS

| JP | 05-084046 A | 4/1993 |
| KR | 10-0297521 B1 | 9/2001 |

(Continued)

OTHER PUBLICATIONS

Varavinit: Effect of Amylose Content on Gelatinization, Retrogradation and Pasting Properties of Flours from Different Cultivars of Thai Rice; Starch/Stärke 55 (2003) 410-415; DOI 10.1002/star.200300185.*

(Continued)

*Primary Examiner* — Humera Sheikh
*Assistant Examiner* — Patricia George
(74) *Attorney, Agent, or Firm* — The PL Law Group, PLLC

(57) ABSTRACT

A method of producing a rice cake that becomes not hardened for a long time period, a rice cake produced by using the method, and a processed food produced by processing the rice cake are provided. The method includes: (a) immersing grains in water and removing the water therefrom; (b) grinding the grains from which water is removed, adding water thereto, and then grinding the grains to which water is added; (c) steaming the ground grains; and (d) cooling the steamed grains, adding flour thereto, and then punching the resultant product. The rice cake has a long storage time and is suitable for a long-term distribution. The rice cake preserves its soft texture for a long time period and is thus appropriate for consumers' acceptability.

12 Claims, 1 Drawing Sheet

FOREIGN PATENT DOCUMENTS

| KR | 10-2002-0093758 A | 12/2002 |
|---|---|---|
| KR | 10-2006-0016478 A | 2/2006 |
| KR | 10-2007-0119886 A | 12/2007 |
| KR | 10-0877505 B1 | 1/2009 |

OTHER PUBLICATIONS

CN101406311 Lisha Li; publication date: Sep. 29, 2010; filed; Nov. 7, 2008; Maching translation; printed Thursday, May 23, 2013 10:00 AM.*

WO2009075492: Kim; ; publication date: Jun. 18, 2009; filed; May 12, 2008.*

International Search Report for PCT/KR2010/009194.
English Abstract of KR10-2002-0093758.
English Abstract of JP05-084046.
English Abstract of KR10-0297521.
English Abstract of KR10-2007-0119886.
English Abstract of KR10-0877505.
English Abstract of KR10-2006-0016478.
Written opinion of International Searching Authority for PCT/KR2010/009194.

* cited by examiner

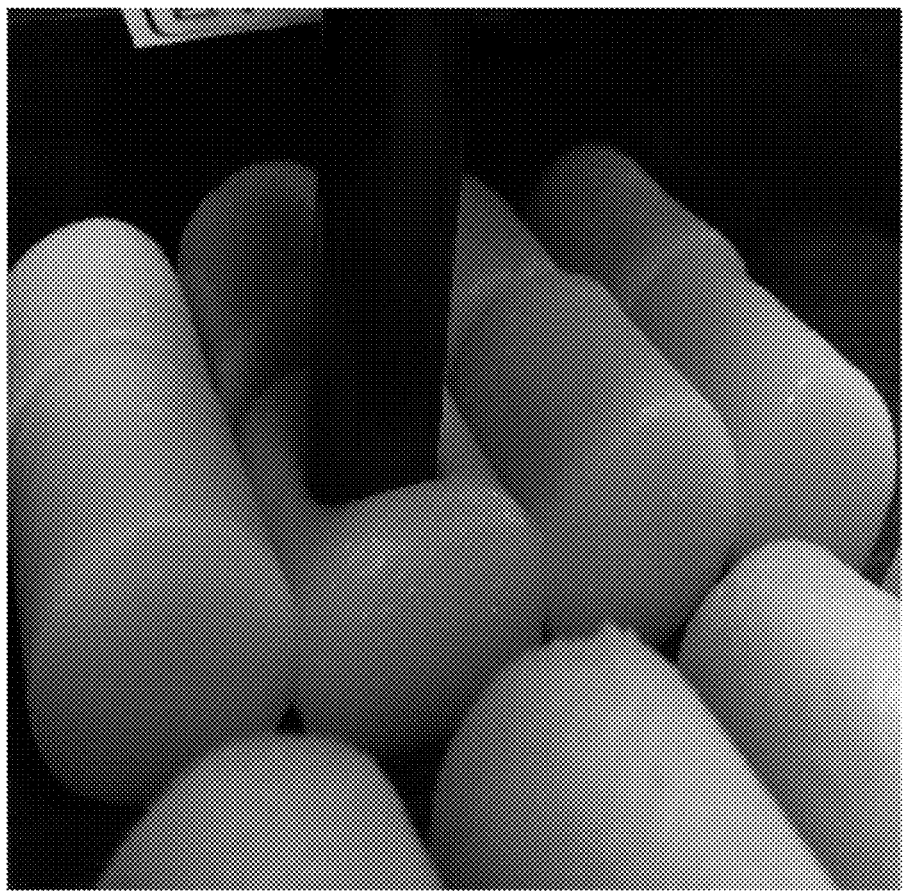

METHOD OF PRODUCING NOT-HARDENED RICE CAKE AND RICE CAKE PRODUCED BY USING THE SAME

CROSS REFERENCE TO RELATED APPLICATION AND CLAIM OF PRIORITY

The present application claims all benefits accruing under 35 U.S.C. §365(c) from the PCT International Application PCT/KR2010/009194, with an International Filing Date of Dec. 22, 2010, which claims the benefit of Korean patent application Nos. 10-2010-0010675 and 10-2010-0123901 filed in the Korean Intellectual Property Office on Feb. 5, 2010 and Dec. 7, 2010, respectively, the entire contents of which are incorporated herein by reference.

TECHNICAL FIELD

The present invention relates to a method of producing a rice cake that is not hardened for a long time period, and a processed food that is produced by processing the rice cake.

BACKGROUND ART

Rice can be categorized as non-glutinous rice and glutinous rice according to transparency, and non-glutinous rice is transparent and glutinous rice is milky and non-transparent. Starch, which is a major component of rice, consists of amylose and amylopectin which are polysaccharides. Glutinous rice mainly consists of amylopectin, and non-glutinous rice consists of 15 to 20% of amylose and 80 to 85% amylopectin. Accordingly, when glutinous rice is cooked or processed to produce rice cake, the glutinous rice is much stickier than the non-glutinous rice, is not hardened even when stored for a long period of time, and retains its springiness and softness for a long period of time. Due to such a big difference in starch tissue between non-glutinous rice and glutinous rice, they are used for different purposes and have different qualities of processed food even when the same process method is used.

Retrogradation of starch refers to local formation of a crystal structure by combination of starch molecules through a hydrogen bond when gelatinized starch is left at room temperature for a long period of time. Due to the formation of hydrogen bond in starch, water present in starch is released out and thus, a product is hardened. Factors that affect retrogradation of starch include various additives and physical and chemical conditions, such as the kind of starch, a ratio of amylose to amylopectin in starch, a storage temperature, a pH, and water content. Many efforts have been made to suppress retrogradation of starch by using trehalose, a surfactant, an emulsifier, an oligosaccharide, or an amylase for saccharifing fresh starch. However, most conventional retrogradation suppression methods include the use of an additive, a preservative, etc. Accordingly, there is still a need to develop a rice cake that has good texture without use of food additives, and has a long storage time enabling the rice cake to be not hardened at room temperature for a long time period.

SUMMARY

Provided is a rice cake that preserves its springiness property enabling its long-term distribution and is suitable for consumers' acceptability due to its not-hardening texture for a long time period, unlike a typical rice cake that is produced using a typical method and is hardened after a predetermined time period after its production, prepared by controlling water content, flour content, cooling time, and punching time, which are factors in producing rice cake, in order to minimize hardness of rice cake during preservation.

According to an aspect of the present invention, a method of producing a rice cake that is not hardened for a long time period includes: (a) immersing grains in water and removing the water therefrom; (b) grinding the grains from which water is removed, adding water thereto, and then grinding the grains to which water is added; (c) steaming the ground grains; and (d) cooling the steamed grains, adding flour thereto, and then punching the resultant product.

According to another aspect of the present invention, a rice cake that is not hardened for a long time period and is produced by using the method is provided.

According to another aspect of the present invention, a processed food produced by processing the rice cake is provided.

A rice cake according to the present invention preserves its humid and springy texture for a longer time period than a typical rice cake by suppressing retrogradation without additives, and also has high consumers' acceptability due to absence of food additives.

In addition, due to its long-term non-hardening property, the rice cake according to the present invention can be stored for a long time period, which enables mass-production and long-term distribution of the rice cake. Furthermore, the rice cake may lead to increasing rice consumption in Korea and may catalyze development of export products for globalization of Korean food.

BRIEF DESCRIPTION OF DRAWINGS

FIG. 1 shows a picture of a rice cake produced by using a method of producing rice cake according to an embodiment of the present invention, three days after production. The rice cake in FIG. 1 still has a springy surface, which shows that the rice cake is not hardened.

DETAILED DESCRIPTION

A method of producing a rice cake that is not hardened for a long time period according to an embodiment of the present invention includes a) immersing grains in water and removing the water therefrom; (b) grinding the grains from which water is removed, adding water thereto, and then grinding the grains to which water is added; (c) steaming the ground grains; and (d) cooling the steamed grains, adding flour thereto, and then punching the resultant product.

The examples of the grains used in the present invention as a material for producing the rice cake that is not hardened may include at least one selected from the group consisting of a non-glutinous rice, a glutinous rice, a barley, oat, wheat, African millet, corns, beans, mung beans, adlay, a millet seed, Panicum miliaceum, red-beans, and buckwheats. For example, the grains may include non-glutinous rice. In addition, when the not-hardened rice cake is produced using non-glutinous rice, white rice and brown rice may be used in combination in an appropriate mixed ratio according to purpose.

Like a typical rice cake production method, in the initial phase, the method of producing rice cake according to the present embodiment includes immersing grains in water and removing the water therefrom. The immersing of the grains in water is performed to allow grain particles to sufficiently absorb water for 2 to 4 hours. Then, the immersed grains experience the water removal process for 20 to 40 minutes so as to remove water present between grain particles.

Once water is removed, salt is added to the grains, and then the grains are ground using a grinding device. Herein, salt is used to produce a rice cake of distinct color, to make the taste of the rice cake better, and to prevent proliferation of microorganisms and corruption. The salt may be replaced with any one of various materials that perform a similar function as the salt. For example, herbacea may be used instead of the salt. An amount of the salt added to the grains may be in a range of 0.5 to 1.5 weight %, preferably, about 1 weight %, based on the weight of the grains. In general, the salt may be used before grains are ground. Alternatively, the salt may be used after grains are ground.

Once the ground grains are prepared, water is added to provide humidity needed in producing rice cake and then the ground grains are ground again. In an embodiment of the present invention, an added water content in the step (b) may be in a range of 22 to 35 weight % based on the weight of the grains in the step (a). Preferably, an added water content in the step (b) may be in a range of 22 to 26 weight % based on the weight of the grains in the step (a). For example, an added water content in the step (b) may be 24 weight % based on the weight of the grains in the step (a). If the amount of the water added is less than 22 weight %, the rice cake is quickly hardened, which is not appropriate for preventing hardening. On the other hand, if the amount of the water added is greater than 35 weight %, for example, when a bar rice cake is molded, a dough may be elongated and thus a diameter of the bar rice cake is small.

The grinding used in an embodiment of the present invention may be any grinding method that is traditionally used in preparing rice cake, and a roller interval of a grinding device and the number of grinding operations performed by a grinding device may differ according to the kind of rice cake. For example, in order to produce a bar rice cake, grains are ground sequentially using a grinding device having a roller interval of 0.4 to 0.6 mm, a grinding device having a roller interval of 0.005 to 0.015 mm, and a grinding device having a roller interval of 0.4 to 0.6 mm after water is added to the twice ground product. According to an embodiment of the present invention, the grains from which water is removed may be ground sequentially using a grinding device having a roller interval of about 0.5 mm, a grinding device having a roller interval of about 0.01 mm, and a grinding device having a roller interval of about 0.5 mm after water is added to the twice ground product.

The finally ground grains are steamed at a temperature of 85 to 100° C. The steaming time may differ according to the kind of rice cake. In general, the steaming time may be in a range of 10 to 20 minutes, preferably 15 minutes. If the steaming time is less than 10 minutes, the rice cake may not be sufficiently cooked after hot vapors arise, and on the other hand, if the steaming time is greater than 20 minutes, a dough obtained after the steaming may be too sticky.

The present invention is technically characterized in that the rice cake that is not hardened for a long time period is produced by controlling, besides the water content, a cooling time for the steamed grains, flour content, and punching time.

In an embodiment of the present invention, the cooling of the steamed grains may be performed at room temperature for 11 to 18 minutes, preferably 13 to 16 minutes, most preferably 15 minutes. In this regard, the temperature of an inner portion of the dough may be maintained at a temperature of 50 to 75° C., preferably, 65 to 70° C. If the cooling time of the steamed grains is less than 11 minutes, after a predetermined time period, for example, 24 hours, hardness of the rice cake may increase to such a level that is inappropriate for preventing hardening of the rice cake. On the other hand, if the cooling time is greater than 18 minutes, the dough may be completely cooled during punching after the cooling and thus, the following molding and extruding of the rice cake may be inefficiently performed.

In an embodiment of the present invention, in order to produce the rice cake that is not hardened for a long time period, flour is added after the cooling. The flour used in an embodiment of the present invention may be high protein flour, medium protein flour, or low protein flour and may not be limited thereto. A flour content added may be in a range of 0.15 to 1.0 weight %, preferably, 0.15 to 0.25 weight %, most preferably, 0.2 weight %, based on the weight of the grains in the step (a). If the flour content is less than 0.15 weight %, after a predetermined time period, for example, 24 hours, hardness of the rice cake may increase to such a level that is inappropriate for preventing hardening of the rice cake. On the other hand, if the flour content is greater than 1.0 weight %, acceptability may be lowered in sensory terms, although the hardness of the rice cake may be lowered.

After the flour is added, punching is performed to homogeneously mix the dough with the flour and to provide the dough texture with particular properties such as adhesiveness or cohesiveness. In the present embodiment, the punching time may be in a range of 5 to 15 minutes, preferably, 7 to 13 minutes. If the punching time is less than 5 minutes, the flour may not be homogeneously mixed with the dough and thus hardening may not be prevented. On the other hand, if the punching time is greater than 15 minutes, the texture of the bar rice cake is too sticky and thus quality of the final product may be degraded.

The method may further include extruding the punched rice cake in order to mold the rice cake dough that is steamed and punched into a shape like a bar rice cake. The extruding may be performed once through three times according to particular purpose. If the extruding is performed twice, the surface of the bar rice cake appears smoother than when the extruding is performed once. However, if the extruding is performed more then three times, the rice cake texture may be too hardened and the rice cake dough is cooled to be inappropriate for extruding.

According to an embodiment of the present invention, a rice cake that is not hardened for a long time period due to its low hardness levels can be manufactured by controlling water content, flour content, cooling time, and punching time. According to an embodiment of the present invention, in order to produce a rice cake that preserves its hardness at low levels for a long time period, the water content added in the step (b) may be in a range of 22 to 35 weight % and the amount of the flour added in the step (d) may be in a range of 0.15 to 1.0 weight %, based on the weight of the grains in the step (a), and the cooling time for the steamed grains in the step (d) may be in a range of 11 to 18 minutes at room temperature. In order to further improve hardness of the rice cake, the punching in the step (d) may be further performed for 5 to 15 minutes.

The present invention provides a method of producing a rice cake that is not hardened for a long time period and has good hardness, good adhesiveness, good springiness, good cohesiveness, good gumminess, good chewiness, and good acceptability and thus has good texture.

According to another embodiment of the present invention to satisfy the characteristics described above, the water content added in the step (b) may be in a range of 22 to 26 weight % and the amount of the four added in the step (d) may be in a range of 0.15 to 0.25 weight %, based on the weight of the grains in the step (a), the cooling time for the steamed grains in the step (d) may be in a range of 13 to 16 minutes at room temperature, and the punching time in the step (d) may be in a range of 7 to 13 minutes.

The present invention also provides a rice cake that is not hardened for a long time period and is produced by using the method described above. As identified by referring to FIG. 1 showing the picture of a rice cake that was stored for three days after production but was not hardened, a rice cake according to the present invention preserves a hardness of less than 1000 for a long time period, which was measured using a texture analyzer (TA-XT2) (see hardness measurement conditions in the following examples), and has excellent sensory properties such as adhesiveness, springiness, cohesiveness, or chewiness. The rice cake produced by using a method according to the present invention may be a bar rice cake, but is not limited thereto. For example, the rice cake may instead be San-byeong, Hwan-byeong, Eo-reum-so-pyeon, Gol-mu-tteok, Jeol-pyeon, Jeol-pyeon made of warmwood, Song-gi-jeol-pyeon, Gak-saek-jeol-pyeon, Large jeol-pyeon, small jeol-pyeon, yang-saek-jeol-pyeon, Gae-pi-tteok, Gae-pi-tteok made of warmwood, Dan-ja, Seok-i-dan-ja, Dan-ja made of warmwood or Mang-gae-tteok.

The present invention also provides a processed food that is produced by processing the rice cake. The processed food may be Tteokbokki, Typical cake-shaped rice cake, Rice-cake soup, Triangle-shaped rice cake kimbab, Rice-cake kimbab roll, Rice-cake hot bar, Rice-cake slice, Rice-cake sandwich, Rice-cake for ice flakes, Rice-cake wet noodle, Rice-cake pizza, Egg-shaped dumpling formed of rice cake, or Fusion rice cake, but is not limited thereto.

Hereinafter, embodiments of the present invention will be described in detail. However, the embodiments are provided for illustrative purpose only and the present invention is not limited to the embodiments.

Test Materials

A rice cake was produced using non-glutinous cooking rice that was harvested in 2009 and polished in 2010, and flour obtained from Daehan flour mills Co., Ltd, and a refined salt obtained from Hanju Corporation.

Preparation Example 1

Production of Bar Rice Cake while Water Content was Changed

Bar rice cake was produced using component ratios and methods shown in Table 1 while the water content, which is a key factor in producing bar rice cake, was changed to be 15, 18, 21 and 24 weight % based on the weight of rice powder. That is, non-glutinous rice was immersed in water for 3 hours, and water was removed therefrom for 30 minutes, and then a salt was added thereto in an amount of 1 weight % based on the weight of the non-glutinous rice, and the mixture including the non-glutinous rice and the salt was ground by a roll grinding device (KM18, Kyungchang Machine, Kyunggido, Korea) using a wet method. The grinding method included a first grinding that was performed at a roll interval of 0.5 mm, a second grinding that was performed at a roll interval of 0.01 mm, and a third grinding that was performed at a roll interval of 0.5 mm with water. Regarding the third grinding, water was selectively used according to the test groups. Then, in each test, the rice was steamed for 15 minutes using a table type rice steamer (Kyungchang machine, Kyunggido, Korea). Then, the steamed rice was cooled at room temperature for 15 minutes and 0.2 weight % of flour based on the weight of the rice powder was added thereto and punching was performed thereon for 13 minutes. The punched dough was added to an extruder (KM102, Kyungchang Machine, Kyunggido, Korea) and extruded twice to prepare rice cake. The produced rice cake was cut to a diameter of 2 cm and a length of 40 cm and cooled at room temperature for about 30 minutes. Then, the rice cake was cut to a size of 5 cm and packaged with a polyethylene wrap and placed in a sealed container (Lock & Lock Co. Inc, Korea) and stored at room temperature (20° C.). The resultant rice cakes were used for tests.

TABLE 1

Component ratios and methods of bar rice cake while the water content added was changed

| Components and | Water content based on the weight of rice powder (%) | | | |
|---|---|---|---|---|
| Methods | 15% | 18% | 21% | 24% |
| Rice powder (g) | 3,000 | 3,000 | 3,000 | 3,000 |
| Salt (g) | 30 | 30 | 30 | 30 |
| Water (ml) | 450 | 540 | 630 | 720 |
| Flour (g) | 6 | 6 | 6 | 6 |
| Cooling time (min) | 15 | 15 | 15 | 15 |
| Punching time (min) | 13 | 13 | 13 | 13 |

Preparation Example 2

Production of Bar Rice Cake while the Flour Content was Changed

Component ratios and methods of bar rice cake while the flour content, which acts as a key factor in the punching process in producing bar rice cake, was changed are shown in Table 2. That is, bar rice cake was prepared in the same manner as in Preparation Example 1, except that the water content based on the weight of the rice powder was 24 weight % and the flour content based on the weight of the rice powder was 0, 0.1, 0.2, and 0.7 weight %.

TABLE 2

Component ratios and methods of bar rice cake while the flour content added was changed

| Components and | Flour content based on the weight of rice powder (%) | | | |
|---|---|---|---|---|
| Methods | 0% | 0.1% | 0.2% | 0.7% |
| Rice powder (g) | 3,000 | 3,000 | 3,000 | 3,000 |
| Salt (g) | 30 | 30 | 30 | 30 |
| Water (ml) | 720 | 720 | 720 | 720 |
| Flour (g) | 0 | 3 | 6 | 21 |
| Cooling time (min) | 15 | 15 | 15 | 15 |
| Punching time (min) | 13 | 13 | 13 | 13 |

Preparation Example 3

Production of Bar Rice Cake while the Cooling Time was Changed

In producing bar rice cake, the temperature of dough acts as a key factor in suppression of retrogradation of rice cake. Accordingly, in order to find an optimal temperature of dough, the cooling time of dough was changed. Component ratios and methods that are used in producing bar rice cake are shown in Table 3. That is, bar rice cake was produced in the same manner as in Preparation Example 1, except that the water content was 24 weight % based on the weight of the rice powder and the cooling time for dough at room temperature was changed to be 0, 5, 10 and 15 minutes. When the dough was cooled for 0, 5, 10 and 15 minutes at room temperature, the temperature of an inner part of the dough was in a range of 98 to 99° C., 88 to 90° C., 78 to 80° C., and 66 to 68° C., respectively.

TABLE 3

Component ratios and methods of bar rice cake while the cooling time of dough was changed

| Components and Methods | Bar rice cake produced at different cooling times | | | |
|---|---|---|---|---|
| Rice powder (g) | 3,000 | 3,000 | 3,000 | 3,000 |
| Salt (g) | 30 | 30 | 30 | 30 |
| Water (ml) | 720 | 720 | 720 | 720 |
| Flour (g) | 6 | 6 | 6 | 6 |
| Cooling time (minutes) | 0 | 5 | 10 | 15 |
| Punching time (minutes) | 13 | 13 | 13 | 13 |

Preparation Example 4

Production of Bar Rice Cake while the Punching Time was Changed

In order to produce bar rice cake while the punching time was changed, the same method as Preparation Example 1 was used, except for the water content was 24 weight % based on the weight of the rice powder and the punching time was changed to be 2, 7, 13 and 20 minutes (see Table 4). The punching was performed 490 times per minute by using a punching device (KM102, Kyungchang Machine, Kwangjoo, Korea).

TABLE 4

Component ratios and methods of bar rice cake while the punching time was changed

| Components and Methods | Bar rice cake produced at different punching times | | | |
|---|---|---|---|---|
| Rice powder (g) | 3,000 | 3,000 | 3,000 | 3,000 |
| Salt (g) | 30 | 30 | 30 | 30 |
| Water (ml) | 720 | 720 | 720 | 720 |
| Flour (g) | 6 | 6 | 6 | 6 |
| Cooling time (minutes) | 15 | 15 | 15 | 15 |
| Punching time (minutes) | 2 | 7 | 13 | 20 |

Evaluation of Qualities of Rice Cake Produced (1) Texture Evaluation

In order to evaluate physical properties of bar rice cakes produced according to the above preparation examples, the samples were uniformly cut to a cylinder form (2 cm of diameter×2.5 cm of length) and loaded into a texture analyzer (TA-XT2, Stable Micro System Ltd., Haslemere, UK). In this experiment, texture profile analysis (TPA) was used and a 2nd bite compression test was repeatedly performed 10 times. The test conditions included a pre-test speed of 5 mm/s, a test speed of 3 mm/s, a post-test speed of 5 mm/s, and stain of 80%. From a force-distance curve obtained from the tests, characteristic values of TPA including hardness, adhesiveness, springiness, cohesiveness, gumminess, and chewiness were analyzed using texture expert software.

(2) Water Content Measurement

In order to measure the water content in bar rice cake according to the flour content, a middle portion of each sample was sliced to a thickness of 0.5 to 0.8 mm and this slicing was repeatedly performed. The slices of the same bar rice cake were uniformly mixed, and 1 g of the mixture was heated at room temperature in air. The same experiment was performed three times. An average value of the experimental results was used.

(3) Sensory Test

In order to perform a bar rice cake sensory test according to the flour amount, a panel consisting of 10 panelists of Rural development administration was repeatedly learned of the test objective and sensory test items of bar rice cake so that they recognized well the test objective and sensory test items. An evaluation table used contained items of whiteness, hardness, springiness, chewiness, and overall acceptability, and the evaluation was performed by scoring the items on the scale of 9. One piece of 5 cm-sized rice cake was placed on a dish and provided to the panel. In each test, the panel was requested to clean their mouths with warm water before the next test was performed.

(4) Statistics Process

The statistics process of the test results was performed by analysis of variance using SAS program (2001), and a significance test ($p<0.05$) was performed using a Duncan's multiple range test.

Example 1

Texture Change of Bar Rice Cake while Water Content was Changed

As a result of a preliminary test for determining water content, it was confirmed that if the water content was less than 13 weight % based on the weight of the rice used, the dough was too hardened and thus a mortar used was overloaded during extruding, on the other hand, if the water content was greater than 35 weight %, the dough was too sticky and the rice cake was elongated and thus became thin. Accordingly, the bar rice cake was produced while the water content was changed to be 15, 18, 21 and 24 weight %. Texture changes of bar rice cake produced at different water contents are shown in Table 5 below. Regarding hardness, the greater water content resulted in the lower hardness, and the hardness increased over storage time. That is, when the water content was 15, 18, 21, and 24 weight %, hardnesses of the bar rice cakes produced using the different water contents were 1520.45, 1001.41, 830.87, and 521.45, respectively, and after 24 hours, the respective hardnesses were 2105.82, 1920.91, 1763.77, and 672.36, respectively. Generally, the hardness of rice cake is performed by retrogradation of starch. Thus, it was confirmed that the greater water content results in the slower retrogradation of starch. Like the hardness results, the greater water content resulted in the lower adhesiveness, gumminess, and chewiness. However, cohesiveness did not make any big difference according to the water content. The greater storage time resulted in the greater hardness of all the rice cakes and in each rice cake, the hardness change was recognizable. In particular, the hardness change corresponding to the water content of 24 weight % was smaller than the hardness change corresponding to the water content of 15 weight %. Meanwhile, it was confirmed that when the sensory evaluation results when the water content was greater than 26 weight % were lower than those when the water content was in a range of 22 to 26 weight %. From the results, it was confirmed that a water content that is effective for preventing hardening of bar rice cake and enables efficiently workability in the production process is in a range of 22 to 35 weight %, and a water content for producing a rice cake that has high qualities in terms of, for example, overall acceptability is in a range of 22 to 26 weight %.

TABLE 5

Texture analysis according to water content when bar rice cake was stored at a temperature of 20° C.

| Texture | Storage time (hr) | Water content (%) based on the weight of rice powder | | | |
|---|---|---|---|---|---|
| | | 15% | 18% | 21% | 24% |
| Hardness*** | 0 | 1520.47$^{a1)}$ | 1001.41$^b$ | 830.87$^c$ | 521.45$^d$ |
| | 24 | 2105.82$^a$ | 1920.91$^b$ | 1763.77$^c$ | 672.36$^d$ |
| Adhesiveness | 0 | −294.50 | −292.70 | −284.93 | −282.73 |
| | 24 | −278.21 | −274.72 | −268.86 | −268.53 |
| Springiness | 0 | 0.87 | 0.87 | 0.87 | 0.86 |
| | 24 | 0.85 | 0.85 | 0.85 | 0.85 |
| Cohesiveness | 0 | 0.69 | 0.69 | 0.69 | 0.69 |
| | 24 | 0.60 | 0.59 | 0.57 | 0.62 |
| Gumminess*** | 0 | 1322.81$^a$ | 703.46$^b$ | 577.21$^c$ | 358.81$^d$ |
| | 24 | 1789.95$^a$ | 1102.53$^b$ | 1074.06$^b$ | 423.24$^c$ |
| Chewiness*** | 0 | 912.74$^a$ | 619.58$^b$ | 503.60$^c$ | 304.29$^d$ |
| | 24 | 1076.97$^a$ | 897.57$^b$ | 873.32$^b$ | 359.04$^c$ |

$^{1)}$Different numerals in the same row have a significant difference at p < 0.05, and the test items indicated by *** have a significant difference at p < 0.001.

Example 2

Change in Quality and Sensory Properties of Bar Rice Cake while Flour Content was Changed (1) Water Content Change The water content changes of bar rice cake according to flour content are shown in Table 6 below. When four was not added in the punching process in producing bar rice cake, the water content slightly decreased from 49.09 weight % (initial value) to 48.93 weight % (after storage time of 24 hours). When the flour content was 0.1, 0.2 and 0.7 weight %, like the four content of 0 weight %, the water content slightly decreased but the decrease change was very small. Accordingly, it was confirmed that the flour does not significantly affect the water content.

TABLE 6

Water content (%) according to flour content when bar rice cake was stored at a temperature of 20° C.

| Flour content (%) based on the weight of rice powder | Storage time (hr) | |
|---|---|---|
| | 0 | 24 |
| 0% | 49.09 ± 0.37$^{ab1)}$ | 48.93 ± 0.37$^{ab}$ |
| 0.1% | 48.40 ± 0.36$^{ab}$ | 48.24 ± 0.43$^{ab}$ |
| 0.2% | 49.18 ± 0.05$^a$ | 49.04 ± 0.07$^a$ |
| 0.7% | 48.95 ± 0.49$^{ab}$ | 48.95 ± 0.37$^{ab}$ |

$^{1)}$Different numerals in the same column have a significant difference at p < 0.05.

(2) Texture Change

Texture results according to flour content in the punching process in producing bar rice cake are shown in Table 7. Regarding texture properties of bar rice cake, compared to when flour was not used, when the flour content increased, hardness, gumminess, and chewiness significantly decreased. However, in the case that the bar rice cake was stored at room temperature (20° C.) for 24 hours, when the flour was used, cohesiveness, springiness, and adhesiveness were similar to those when the flour was not used. Regarding hardness which shows a degree at which the rice cake is hardened, the hardness when the flour was used was lower than the hardness when the flour was not used, and the greater flour content resulted in the lower hardness. When the hardness when the flour content was 0.1 weight % was lower than the hardness when the flour was not used, the hardening of the bar rice cake was confirmed on appearance. When the flour content was greater than 1.0 weight %, the hardness was lower than when the flour was not used. In this case, however, overall acceptability considered based on textures such as adhesiveness or springiness was low. Accordingly, it was confirmed that when bar rice cake was distributed at room temperature (20° C.), 0.15 to 1.0 weight % of flour content used in the punching process in producing bar rice cake is effective for maintaining qualities of rice cake at high levels and for minimizing hardening of rice cake.

TABLE 7

Texture analysis according to flour content when bar rice cake was stored at a temperature of 20° C.

| Texture | Storage time(hr) | Flour content based on the weight of rice power (%) | | | |
|---|---|---|---|---|---|
| | | 0% | 0.1% | 0.2% | 0.7% |
| Hardness*** | 0 | 749.98$^{a1)}$ | 694.65$^b$ | 587.72$^c$ | 559.21$^d$ |
| | 24 | 2676.50$^a$ | 1593.86$^b$ | 745.24$^c$ | 613.96$^d$ |
| Adhesiveness | 0 | −260.53 | −282.01 | −325.75 | −327.14 |
| | 24 | −270.68 | −288.11 | −286.83 | −285.76 |
| Springiness | 0 | 0.87 | 0.86 | 0.83 | 0.83 |
| | 24 | 0.96 | 0.83 | 0.84 | 0.85 |
| Cohesiveness | 0 | 0.68 | 0.68 | 0.66 | 0.67 |
| | 24 | 0.63 | 0.63 | 0.62 | 0.64 |
| Gumminess*** | 0 | 511.57$^a$ | 480.88$^a$ | 387.09$^b$ | 372.37$^b$ |
| | 24 | 1482.85$^a$ | 955.69$^b$ | 464.65$^c$ | 395.87$^d$ |
| Chewiness*** | 0 | 446.15$^a$ | 414.38$^a$ | 321.72$^b$ | 308.42$^b$ |
| | 24 | 1421.37$^a$ | 796.68$^b$ | 390.35$^c$ | 336.41$^c$ |

$^{1)}$Different numerals in the same row have a significant difference at p < 0.05, and the test items indicated by *** have a significant difference at p < 0.001.

(3) Change in Sensory Properties

Sensory properties according to storage time of bar rice cake at different flour contents were evaluated and the results are shown in Table 8 below. First, regarding whiteness, whiteness when flour was not used was the highest and the greater flour content resulted in the lower whiteness. Regarding hardness, after 24 hours, compared to when the flour was not used, the greater flour content resulted in the lower hardness. Thus, it was confirmed that use of flour leads to prevention of hardening rice cake. Regarding springiness, immediately after the production of rice cake, springiness when the flour was not used was highest as 6.65. However, after 24 hours, springiness when the flour content was 0.2 weight % was highest as 6.60. Regarding chewiness, all the samples did not show almost any chewiness difference. Thus, it was confirmed that texture properties are not affected because the flour content was too small. Regarding overall acceptability, for all the storage times of 0 and 24 hours, overall acceptability when the flour content was 0.2 weight % was the highest. In addition, overall acceptability when the flour was not used decreased from 5.50 (immediately after the production) to 2.89 (after 24 hours) since retrogradation progressed. In terms of a retrogradation rate, when the flour was not used, the retrogradation rate was the highest and thus its texture was worst, and when the flour content was 0.7 weight %, the hardness was the lowest but its acceptability was low. Accordingly, it was confirmed that 0.15 to 0.25 weight % of the flour content is appropriate for producing a rice cake that is slowly hardened and has good sensory properties such as overall acceptability.

TABLE 8

Sensory properties according to flour content when bar rice cake was stored at a temperature of 20° C.

| Texture | Storage Time (hr) | Flour content based on the weight of rice powder (%) | | | |
|---|---|---|---|---|---|
| | | 0% | 0.1% | 0.2% | 0.7% |
| Whiteness | 0 | 6.60$^{a1)}$ | 5.30$^{bc}$ | 5.75$^{b}$ | 5.75$^{b}$ |
| | 24 | 6.45$^{a}$ | 5.50$^{b}$ | 5.30$^{b}$ | 4.80$^{bc}$ |
| Hardness*** | 0 | 5.95$^{ab}$ | 6.20$^{a}$ | 4.00$^{c}$ | 4.05$^{c}$ |
| | 24 | 8.20$^{a}$ | 6.10$^{b}$ | 4.30$^{c}$ | 3.45$^{cd}$ |
| Springiness | 0 | 6.65$^{a}$ | 6.40$^{ab}$ | 5.05$^{bc}$ | 5.10$^{bc}$ |
| | 24 | 2.80$^{c}$ | 5.90$^{ab}$ | 6.60$^{a}$ | 5.95$^{ab}$ |
| Chewiness*** | 0 | 6.65$^{b}$ | 7.30$^{a}$ | 5.10$^{c}$ | 4.75$^{c}$ |
| | 24 | 4.80$^{ab}$ | 5.25$^{a}$ | 5.15$^{a}$ | 5.10$^{a}$ |
| Overall acceptability*** | 0 | 5.50$^{c}$ | 5.25$^{c}$ | 7.25$^{a}$ | 6.60$^{ab}$ |
| | 24 | 2.89$^{d}$ | 5.72$^{c}$ | 7.72$^{a}$ | 6.89$^{ab}$ |

$^{1)}$Different numerals in the same row have a significant difference at p < 0.05, and the test items indicated by *** have a significant difference at p < 0.001.

Example 3

Texture Change of Bar Rice Cake at Different Cooling Times

As a result of a preliminary test, it was confirmed that when the cooling time for dough was greater than 18 minutes, the dough was completely cooled and thus was not appropriate for the following rice cake molding and rice cake extruding processes into bar rice cake. Accordingly, the cooling time for dough was determined to be 0, 5, 10, and 15 minutes and bar rice cakes were produced at the different cooling times and textures thereof were evaluated, and the results are shown in Table 9 below. When the cooling time was 0, 5, 10 and 15 minutes at room temperature, the temperature of an inner portion of the samples was in a range of 98 to 99° C., 88 to 90° C., 78 to 80° C., and 66 to 68° C., respectively. Regarding the texture change of the bar rice cake immediately after production, when the cooling time increased, the hardness was slightly constant. However, after the storage time of 24 hours, the greater cooling time resulted in the lower hardness. In addition, gumminess and chewiness showed similar results to those of the hardness, and springiness and adhesiveness did not show any big difference according to the cooling time. From the results shown in Table 9, it was confirmed that the cooling time after steaming to minimizing hardening of bar rice cake is in a range of 11 to 18 minutes. Meanwhile, as a result of the sensory test, overall acceptability was the highest at the cooling time of 15 minutes. Accordingly, it was confirmed that 13 minutes to 16 minutes of the cooling time was appropriate for producing bar rice cake having good sensory properties.

TABLE 9

Texture analysis according to cooling time when bar rice cake was stored at a temperature of 20° C.

| Texture | Storage time (hr) | Cooling time (minutes) | | | |
|---|---|---|---|---|---|
| | | 0 | 5 | 10 | 15 |
| Hardness*** | 0 | 643.95 | 638.19 | 653.20 | 635.87 |
| | 24 | 2128.02$^{a1)}$ | 1736.23$^{b}$ | 1033.13$^{c}$ | 760.21$^{d}$ |
| Adhesiveness | 0 | −283.03 | −273.23 | −296.08 | −302.60 |
| | 24 | −175.04 | −780.68 | −374.33 | −363.03 |
| Springiness | 0 | 0.85 | 0.85 | 0.85 | 0.85 |
| | 24 | 0.88 | 0.82 | 0.84 | 0.86 |
| Cohesiveness | 0 | 0.65 | 0.66 | 0.67 | 0.66 |
| | 24 | 0.54 | 0.59 | 0.61 | 0.65 |
| Gumminess*** | 0 | 421.13 | 422.08 | 436.91 | 419.60 |
| | 24 | 1149.75$^{a}$ | 1023.60$^{b}$ | 645.96$^{c}$ | 594.12$^{d}$ |
| Chewiness*** | 0 | 359.55$^{ab}$ | 358.97$^{ab}$ | 370.21$^{a}$ | 357.11$^{ab}$ |
| | 24 | 1010.19$^{a}$ | 840.76$^{b}$ | 541.65$^{c}$ | 511.86$^{c}$ |

$^{1)}$Different numerals in the same row have a significant difference at p < 0.05, and the test items indicated by *** have a significant difference at p < 0.001.

Example 4

Texture Change of Bar Rice Cake while Punching Time was Changed

Texture changes of bar rice cakes produced with different punching times were measured and the results are shown in Table 10 below. Among the punching times of 2, 7, 13 and 20 minutes, immediately after production of rice cake, at the punching time of 2, 7, and 13, the greater punching time resulted in the lower hardness. However, at the punching time of 20 minutes, the hardness increased again. After 24 hours, the greater punching time resulted in the higher hardness. In detail, up to the punching time of 13 minutes, the increase difference was relatively small. However, at the punching time of 20 minutes, the increase difference was relatively great. The cohesiveness, springiness, adhesiveness, gumminess, and chewiness showed similar results to those of the hardness. All the rice cakes produced by punching had the hardness of 850 or less in all the punching cases and thus had better not-hardening properties than when rice cake was produced without punching. Meanwhile, when the punching time was 2 minutes, the hardness after 24 hours was the lowest. In this case, however, the flour was not uniformly mixed with the other components and thus, the hardening prevention effect was relatively small. When the punching time was 20 minutes or more, the texture of the bar rice cake was too tough, thereby adversely affecting qualities of the bar rice cake. From the results, it was confirmed that although not-hardened rice cake is produced by controlling water content, flour content, and cooling time, punching attributes to production of rice cake that is not hardened for a longer time period and in particular, 7 to 13 minutes of punching time is appropriate for production of rice cake that has good sensory properties and becomes not hardened.

TABLE 10

Texture analysis according to punching time when bar rice cake was stored at a temperature of 20° C.

| Texture | Storage time (hr) | Punching time (minutes) | | | |
|---|---|---|---|---|---|
| | | 2 | 7 | 13 | 20 |
| Hardness*** | 0 | 554.89$^{ab1)}$ | 525.00$^{ab}$ | 488.10$^{c}$ | 561.36$^{a}$ |
| | 24 | 735.29$^{bc}$ | 760.75$^{b}$ | 764.72$^{b}$ | 836.40$^{a}$ |
| Adhesiveness | 0 | −315.21 | −317.04 | −311.30 | −324.86 |
| | 24 | −221.55 | −284.45 | −210.82 | −340.95 |
| Springiness | 0 | 0.85 | 0.84 | 0.83 | 0.84 |
| | 24 | 0.87 | 0.86 | 0.86 | 0.84 |

TABLE 10-continued

Texture analysis according to punching time when bar rice cake was stored at a temperature of 20° C.

| Texture | Storage time (hr) | Punching time (minutes) | | | |
|---|---|---|---|---|---|
| | | 2 | 7 | 13 | 20 |
| Cohesiveness | 0 | 0.65 | 0.66 | 0.68 | 0.68 |
| | 24 | 0.54 | 0.65 | 0.66 | 0.63 |
| Gumminess*** | 0 | 368.85$^a$ | 356.28$^{ab}$ | 335.05$^b$ | 368.42$^a$ |
| | 24 | 473.97$^b$ | 491.94$^b$ | 516.01$^a$ | 520.17$^a$ |
| Chewiness*** | 0 | 313.25$^a$ | 299.63$^{ab}$ | 279.57$^c$ | 309.83$^{ab}$ |
| | 24 | 414.44$^{ab}$ | 425.00$^{ab}$ | 436.14$^a$ | 439.11$^a$ |

[1]Different numerals in the same row have a significant difference at $p < 0.05$, and the test items indicated by *** have a significant difference at $p < 0.001$.

Example 5

Hardness Change when Bar Rice Cake was Stored at a Temperature of 20° C. for 48 Hours Rice cake (rice cake according to the present invention) was produced under conditions including a water content of 24 weight %, a flour content of 0.2 weight %, and a dough cooling time of 15 minutes, and a punching time of 13 minutes, which are optimal conditions determined in the examples above. As a comparative example, rice cake was produced using water in an amount of 24 weight % based on the weight of rice powder by extruding-molding without cooling, use of flour, and punching. Hardness of the rice cake was compared to hardness of the comparative rice cake. As a result, it was confirmed that the hardness of the rice cake according to the example of the present invention was not almost changed even after 48 hours.

TABLE 11

Hardness change when bar rice cake was stored at a temperature of 20° C. for 48 hours

| Texture | Storage time (hr) | Kind of Sample | |
|---|---|---|---|
| | | Comparative Example | Rice cake according to the examples of the present invention |
| Hardness | 0 | 539.95 ± 15.79 | 536.26 ± 12.29 |
| | 6 | 539.95 ± 15.79 | 543.26 ± 12.29 |
| | 24 | 1084.89 ± 48.94 | 697.31 ± 44.47 |
| | 48 | 1922.31 ± 81.91 | 650.50 ± 35.96 |

It should be understood that the exemplary embodiments described herein should be considered in a descriptive sense only and not for purposes of limitation. Descriptions of features or aspects within each embodiment should typically be considered as available for other similar features or aspects in other embodiments.

The invention claimed is:

1. A method of producing a rice cake, the method comprising:
   immersing grain in water and removing the water therefrom;
   grinding the grain from which water is removed,
   adding water in a range of 22 to 35 weight % based on the weight of the grain thereto, and then grinding the grain to which water is added;
   steaming the ground grain; and
   cooling the steamed grain in a range of 11 to 18 minutes at room temperature,
   adding flour in a range of 0.15 to 1.0 weight % based on the weight of the grain thereto, and then
   punching the resultant product to produce a rice cake.

2. The method of claim 1, further comprising extruding the punched rice cake.

3. The method of claim 1, wherein the grain comprises at least one selected from the group consisting of a non-glutinous rice, a glutinous rice, a barley, oat, wheat, African millet, corn, bean, mung bean, adlay, a millet seed, Panicum miliaceum, red-bean, and buckwheat.

4. The method of claim 3, wherein the grain comprises the non-glutinous rice.

5. The method of claim 1, wherein the punching is performed for 5 to 15 minutes.

6. The method of claim 1, wherein an added water content in the adding of water is in a range of 22 to 26 weight % based on the weight of the grain.

7. The method of claim 1, wherein an added flour content in the adding of flour is in a range of 0.15 to 0.25 weight % based on the weight of the grain.

8. The method of claim 1, wherein a cooling time in the cooling of the steamed grain is in a range of 13 to 16 minutes at room temperature.

9. The method of claim 1, wherein the punching is performed for 7 to 13 minutes.

10. The method of claim 1, further comprising adding salt or herbacea.

11. The method of claim 1, wherein an added water content in the adding of water is in a range of 22 to 26 weight % based on the weight of the grain, an added flour content in the adding of flour is in a range of 0.15 to 0.25 weight % based on the weight of the grain, and a cooling time in the cooling of the steamed grain is in a range of 13 to 16 minutes at room temperature.

12. The method of claim 1, wherein an added water content in the adding of water is 24 weight % based on the weight of the grain, and an added flour content in the adding of flour is 0.2 weight % based on the weight of the grain, a cooling time in the cooling of the steamed grain is 15 minutes at room temperature, and the punching is performed for 13 minutes.

* * * * *